C. MACBETH.
MANUFACTURE OF TIRE CASINGS.
APPLICATION FILED MAY 14, 1915.
1,174,885.
Patented Mar. 7, 1916.
3 SHEETS—SHEET 1.
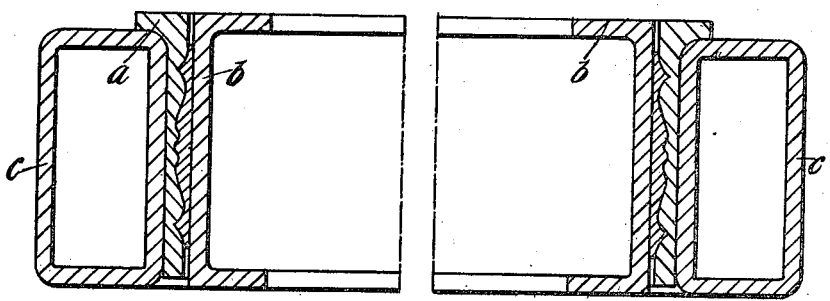
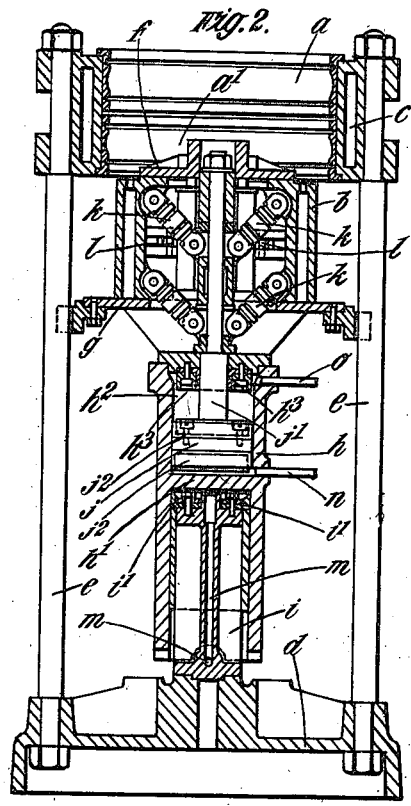
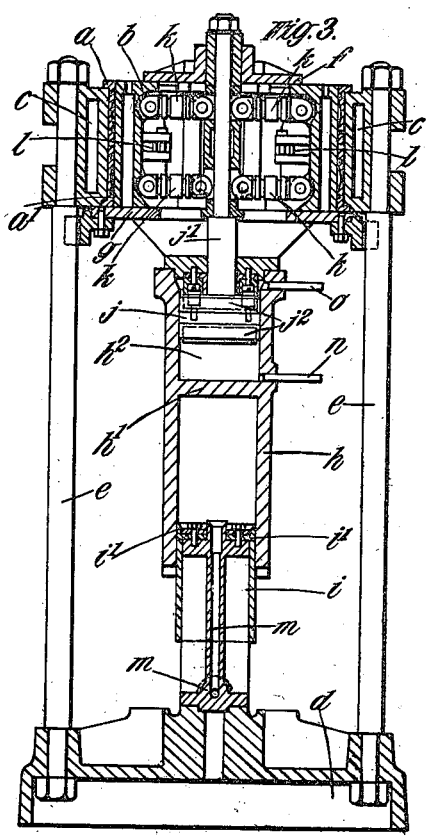
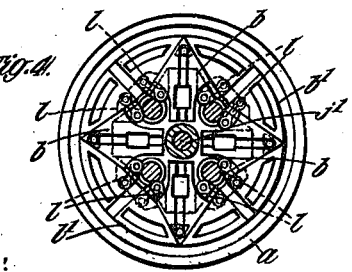
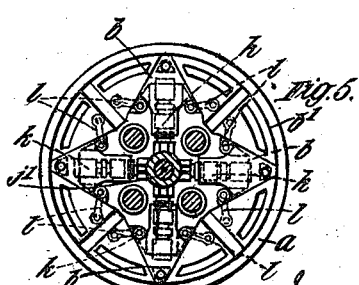

C. MACBETH.
MANUFACTURE OF TIRE CASINGS.
APPLICATION FILED MAY 14, 1915.
1,174,885.
Patented Mar. 7, 1916.
3 SHEETS—SHEET 2.
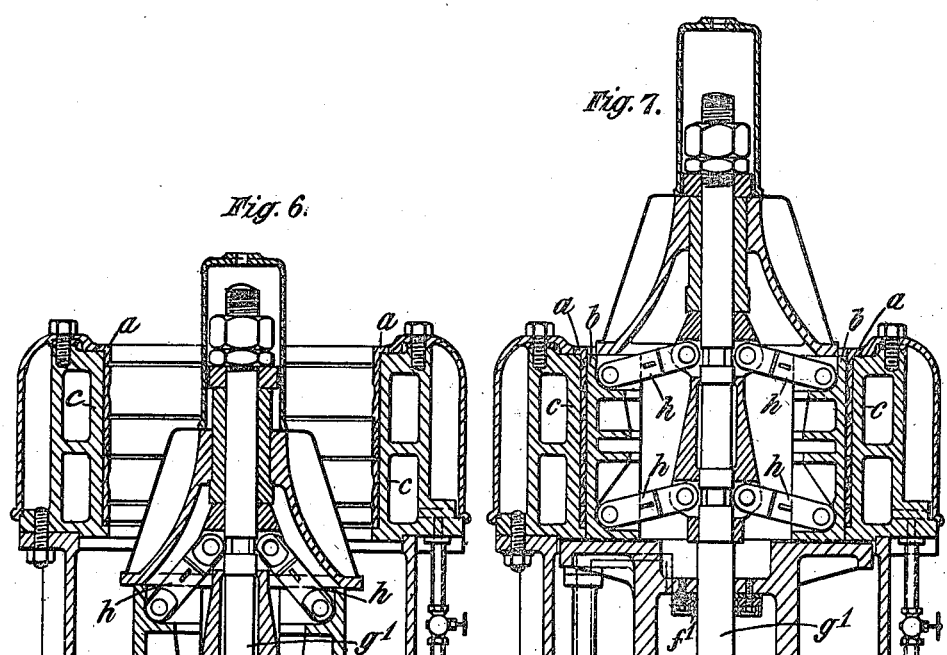

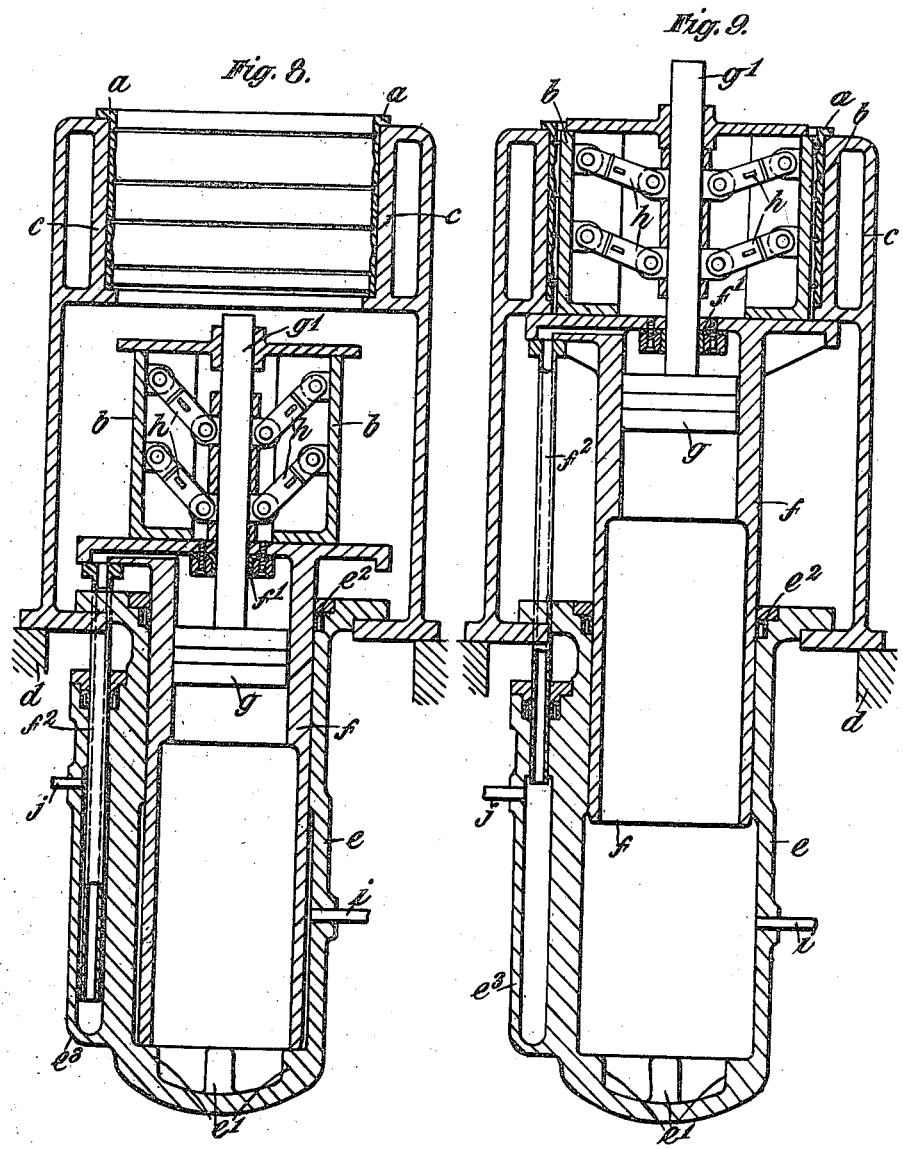

UNITED STATES PATENT OFFICE.

COLIN MACBETH, OF ASTON, BIRMINGHAM, ENGLAND, ASSIGNOR TO THE DUNLOP RUBBER COMPANY, LIMITED, OF WESTMINSTER, ENGLAND.

MANUFACTURE OF TIRE-CASINGS.

1,174,885.  Specification of Letters Patent.  Patented Mar. 7, 1916.

Application filed May 14, 1915. Serial No. 28,240.

*To all whom it may concern:*

Be it known that I, COLIN MACBETH, a subject of the King of Great Britain, residing at Manor Mills, Salford street, Aston, Birmingham, in the county of Warwick, England, have invented certain new and useful Improvements in the Manufacture of Tire-Casings, of which the following is a specification.
This invention relates to the manufacture of tire covers or casings, more particularly (though not exclusively) to those having beaded or similar edges, which when the cover or casing is in its uncured condition are not rigid or self-supporting as are wire edged covers or casings.

The chief object of the present invention is to provide an improved method of and apparatus for partially vulcanizing the tire cover prior to the "curling" operation which latter imparts to the tire cover the approximate shape it assumes when on the wheel rim.

According to this invention the tire cover or casing in its uncured condition is supported horizontally in a flat or approximately flat condition so as to be in the form of a cylinder or substantially so having a vertical axis and is pressed by expansible or contractible means into contact with a suitably grooved vertical or substantially vertical surface which imparts the desired configuration to the cover or casing or molds it, the vulcanization or curing of the cover being effected in any convenient manner while it is under pressure, preferably by suitably heating the said grooved surface. The grooved vertical surface may be provided on the internal face of an annular member or ring having a vertical axis and an expanding head may be disposed within the said ring for forcing the cover into the internal groove on the ring; the latter may be detachably mounted within a hollow member that can be supplied with steam to heat the ring and thus effect the curing of the cover. The aforesaid grooved ring may receive one or more covers and if desired more than one ring may be used, the covers being pressed into the ring or rings by one expanding head. The grooved surface of the ring may be such that when the cover or casing is supported or retained therein the internal surface of the cover is preferably parallel with the axis of the ring although the groove may be of such shape or depth that the cover or casing is not quite parallel with the said axis, that is to say the cover may be approximately flat or curved to some extent without being extremely curved or arched as is usual with wire edged covers which are vulcanized according to the ordinary Doughty process. The tire casing is held in place in the ring by means of the ribs or protuberances of the casing engaging in the grooves or interstices of the ring. To insert the casing into the ring, the tire is slightly compressed, and when in proper position is allowed to spring outwardly into contact with the inner surface of the ring, so that the tire is held suspended by means of the protuberances without the use of any other supporting member. The expanding head which may be capable of axial movement relatively to the ring so as to be moved into and out of the grooved ring when desired, may comprise as is usual in apparatus of this kind a number of segments or portions that can be moved outwardly to subject the cover to pressure, and can be moved inwardly to release the cover and allow the expanding head to be moved out of the grooved ring. The movements of the head may be effected by hydraulic pressure, or any other suitable means, the head being preferably first raised into the ring and then expanded.

In order that the said invention may be clearly understood and readily carried into effect it will now be described more fully with reference to the accompanying drawings, in which—

Figure 1 is a diagrammatic sectional view of one form of the grooved ring showing the tire cover held in position by the expanding head. Figs. 2 and 3 are sectional elevations of one construction of the apparatus showing the expanding head in the lowered or inoperative position and in the raised or operative position respectively. Figs. 4 and 5 are plan views showing the expanding head within the grooved ring in the contracted and expanded positions respectively. Figs. 6 and 7 and Figs. 8 and 9 are similar views to Figs. 2 and 3 illustrating two modified constructional forms of the improved apparatus.

Throughout the aforesaid figures, $a$ is the grooved ring which as shown in Fig. 1 is arranged with its axis vertical and is provided with a vertical inner surface which is grooved or recessed to receive a single tire cover flatwise: it will be seen in Fig. 1 that the groove in the ring $a$ is such that the internal surface of the beaded cover or casing is parallel with the vertical axis of the ring.

$b, b'$, indicate the different segments or portions of which the expanding head is composed the said segments being adapted to bear or press the cover against the internal grooved or recessed surface of the ring $a$. The groove in the ring $a$ may be so shaped that the tread portion is slightly inset and thus curved to a small extent, in which case the segments of the expanding head would be correspondingly shaped to conform to the slightly curved condition of the cover.

$c$ is the heating chamber or ring on which the grooved ring $a$ is supported preferably detachably and which is hollow to receive steam for imparting the required temperature to the grooved ring and to the casing to effect vulcanization or curing of the latter.

In the example shown in Figs. 2 and 3 the heating ring is supported on a suitable base $d$ by standards $e$ and it is of sufficient depth or height to receive two grooved rings $a, a'$ for two covers (or a single ring suitably grooved to receive two covers) both of which covers can be acted upon by the expanding head and vulcanized simultaneously. The expanding head as shown in Figs. 4 and 5 is composed of a number of inner segments $b, b, b, b$, and outer segments $b', b', b', b'$, which are capable of laterally moving inwardly and outwardly between lower and upper plates or guides $f, g$ respectively (see Figs. 2 and 3) the upper plate $f$ being small enough to pass into and through the grooved ring $a$ while the lower plate $g$ is adapted to engage with the lower part of the heating ring $c$ when the expanding head is ready to press the tire casing into the grooved rings $a, a'$. The lower plate $g$ is secured to or forms part of a cylinder $h$ which is capable of vertical movement on a fixed piston $i$ secured to the base $d$ of the apparatus, the upper part of the cylinder being provided with a closed or solid division piece $h'$ which forms a space or second cylinder $h^2$ (see Fig. 3) containing a relatively movable piston $j$. The movable piston $j$ which normally rests upon the division piece $h'$ is provided with a rod $j'$ extending through the upper end of the cylinder $h$ which rod is pivotally connected to each of the inner segments $b$ by two links $k\ k$ that are inclined when the piston $j$ is in its normal or lower position and resting upon the division piece $h'$. The inner segments $b$ are connected to the outer segments $b'$ by links $l\ l$ and when the piston is in its normal or lowered position the links $k\ k$ retain the inner segments $b, b$ in the contracted position which segments in turn retain the outer segments $b', b'$, in the contracted position by means of the links $l, l$. The lowered or inoperative position of the expanding head and the cylinder $j$ is shown in Fig. 2. The raising and expanding movements are preferably effected by hydraulic pressure for which purpose the fixed piston $i$ and the movable piston $j$ are respectively provided with packing rings $i'\ j^2$ of leather or other suitable material, the cylinder $h$ also being provided with a packing ring $h^3$ which surrounds the piston rod $j'$.

In order to raise the cylinder $h$ and the expanding head, water under pressure is admitted to the cylinder $h$ below the division piece $h'$ through the opening $m$ in the fixed piston $i$. In moving upwardly the cylinder $h$ carries the piston $j$, by means of the division piece $h'$ the upward movement being arrested by the lower guide plate $g$ coming into contact with the heating ring $c$ in which position the expanding head is fully raised into the grooved ring $a$. Water under pressure is then admitted through the pipe $n$ to the space or cylinder $h^2$ above the division piece $h'$ and below the movable piston $j$ with the result that the latter is raised relatively to the cylinder $h$ and causes the links $k\ k$ to gradually assume horizontal positions, or approximately so. Thus the inner segments $b\ b$ are forced outwardly in radial directions and cause the segments $b', b'$ to move outwardly so that the inner and outer segments present a flush annular surface which presses against the flat inner surface of the tire covers. Steam is admitted to the heating ring $c$ to heat the grooved ring $a$ and the covers as required. When the vulcanization is finished, high pressure water is admitted above the piston $j$ through the pipe $o$ and the water below the piston gradually flows from the space or cylinder so that the piston $j$ descends gradually, and causes the contraction of the inner and outer segments to take place. The water in the cylinder $h$ below the division piece $h'$ is then allowed to flow from the cylinder $h$ thus permitting the latter and the expanding head to descend gradually into the position shown in Fig. 2. The tire cover can then be removed from the grooved ring and afterward subjected to further vulcanization when supported in a curved or arched position in order to impart the final or required shape to the cover.

In the modifications shown in Figs. 6 and 8 the shell or casing of the apparatus is supported upon foundations $d\ d$ and its lower part constitutes a cylinder $e$ in which is provided a slidable sleeve or inner cylinder $f$ carrying the expanding head; stops or abutments $e'$ are provided at the bottom of the cylinder $e$ upon which stops the sleeve $f$ is normally supported. The movable piston $g$ operates within the sleeve $f$ and is provided with a piston rod $g'$ which as in the previous construction is connected to the expanding head segments $b$ by means of toggle links $h\ h$. The piston rod $g'$ passes through a suitable packing ring $f'$ secured to the sleeve $f$; a packing ring $e^2$ surrounding the sleeve $f$ is secured in the said cylinder $e$ and suitable packing rings are provided on the piston $g$.

In both the examples shown in Figs. 6 and 8 water under suitable pressure can be supplied to the space below the piston $g$ through a connection $i$ and also to the space above the piston $g$ through the connection $j$ communicating with a pipe $f^2$ which is secured to the sleeve $f$ and is adapted to slide within a stationary cylinder $e^3$ secured to or forming part of the cylinder $e$.

When it is desired to effect the vertical raising and the radial movement of the expanding head in Fig. 6, water under low pressure is admitted to the interior of the sleeve $f$ below the piston $g$ through the connection $i$, with the result that the piston $g$ is moved upwardly in the sleeve $f$ as far as possible and consequently raises the sleeve and the expanding head; the toggle links $h$ in this example are so arranged that they maintain the expanding head segments $b$ contracted during the raising of the sleeve and the head. When the sleeve and the head are fully raised, water under high pressure is admitted through the connection $j$ and the sliding pipe $f^2$ to the space above the piston $g$ thereby forcing the latter downwardly in the sleeve $f$ (while the sleeve remains stationary) so that the piston rod in moving downward tends to straighten the toggle links $h$ and thus force the expanding head segments $b$ outwardly in a radial direction to press the tire covers into the grooves in the ring $a$ as set forth above. When the water pressure above the piston $g$ is relieved the piston can be raised to contract the expanding head segments $b$ and the sleeve $f$ and the said head can then be lowered by relieving the water pressure below the piston.

In the example shown in Fig. 8 the toggle links $h$ are so arranged that the segments $b$ are expanded when the piston is moved upwardly, this arrangement being the converse of that shown in Fig. 6. When it is desired to raise the expanding head, water under high pressure is first admitted to the space above the piston through the connection $j$ and the sliding pipe $f^2$ thus maintaining the piston in its lowest position in the sleeve and the segments contracted. While the piston is under this high pressure, water under low pressure is admitted to the space below the piston through the connection $i$ with the result that the sleeve $f$ and the expanding head are raised; so long as the pressure above the piston is in excess of that below the piston the latter will not be displaced in the sleeve but will move with it and maintain the segments in the contracted position. The upward movement of the sleeve $f$ is limited in the fully raised position by the latter coming into contact with the bottom of the heating chamber $c$ at which time the pressure of the water below the piston can be made to exceed that above the piston, in order to raise the piston in the sleeve and thus effect the expanding movement of the segments $b$. When the pressure below the piston is relieved the said piston is moved downwardly (by the greater pressure above it) to contract the segments after which the sleeve and the expanding head will descend to the lowest position shown in Fig. 8.

What I claim and desire to secure by Letters Patent of the United States is:—

1. In an apparatus for molding or vulcanizing tire covers, an annular ring adapted to receive a tire cover substantially flatwise, an expanding head having a number of radially movable inner segments and a number of radially movable outer segments, a pair of toggle links in radial alinement connected at their outer ends to each of said inner segments, a link connecting each inner segment to the adjacent outer segment, means for moving the expanding head into the ring and for actuating said toggle links in unison to move the inner segments radially and thereby move the outer segments simultaneously therewith.

2. An apparatus for molding and vulcanizing tire covers, a ring for receiving the tire cover, an expanding head composed of a number of radially movable segments, a longitudinally movable cylinder having its lower end open and carrying the expanding head, a movable piston within said cylinder connected to said segments, means for admitting fluid pressure to the open end of the cylinder to act on the exposed side of the piston and move said cylinder and piston simultaneously, and means for regulating the fluid pressure on the opposite side of said piston to retain the piston and cylinder against relative displacement during the simultaneous movement of the piston and cylinder and move the piston relative to the cylinder to actuate said segments after the cylinder has been raised to its uppermost position.

3. In an apparatus for molding and vulcanizing tire covers, a ring adapted to receive a tire cover, an expanding head composed of a number of radially movable segments, toggle links connected to the segments, a longitudinally movable cylinder or sleeve having its lower end open and carrying the expanding head, a piston within said cylinder adapted to move relative thereto and connected to said toggle links, means for admitting fluid pressure into the open end of the cylinder to act against the exposed face of the piston for raising the cylinder and piston simultaneously, means for admitting fluid pressure onto the opposite side of the piston for maintaining said piston in a predetermined position within the cylinder during the movement of the latter, the fluid pressure upon opposite sides of said piston being changed after said head is in raised position for actuating said segments.

4. In an apparatus for molding and vulcanizing tires, a ring adapted to receive a tire cover, an expanding head composed of a number of radially movable segments, a longitudinally movable cylinder or sleeve having its lower end open and carrying the expanding head, a piston within and movable relative to the cylinder and having its lower exposed face adapted to be acted against by the pressure admitted to the open end of said cylinder, connections between the movable segments and piston, means for admitting fluid pressure into the open end of the cylinder and onto the under face of the piston for raising the cylinder and piston, said sleeve having a port leading to the interior of the cylinder above said piston, a stationary inlet port for admitting fluid pressure to the upper face of said piston, and a telescopic connection between said pipe and port connecting the same and permitting movement of said cylinder, the fluid pressure above said piston being greater than the fluid pressure beneath the same to maintain the piston and segments in a predetermined position during movement of said sleeve or cylinder and being decreased below the pressure of the fluid within the open end of the cylinder and beneath the said piston after said cylinder and head are in raised position to move said segments outwardly.

5. In an apparatus for molding tire covers or casings, an annular member having an internal cylindrical surface to receive and support one or more tire casings in the form of cylinders, an expanding head composed of a number of inelastic segments which when expanded form a cylinder, and toggle mechanism for positively moving the segments radially.

6. In an apparatus for molding tire covers or casings, an annular vulcanizing head, an annular ring having a substantially flat inner periphery removably mounted in said head, means on the inner periphery of said ring to receive and support a tire in substantially flatwise condition, and radially acting inelastic pressure devices within said ring.

7. In an apparatus for molding tire covers or casings, a vulcanizing head, an annular ring having a substantially flat molding surface removably mounted on said head, means on said ring to receive and support a tire casing in substantially flat condition, rigid pressure plates opposed to said ring, and means for moving said plates radially to compress said tire casing against said ring.

8. In an apparatus for simultaneously molding and vulcanizing tire casings, an annular member or ring having a vertical axis, and an internal cylindrical surface substantially of uniform diameter adapted to receive the covers substantially flatwise, means for heating said apparatus to vulcanize the casing, inelastic movable segments, and means for simultaneously and positively forcing all of said segments with uniform circumferential pressure into contact with the whole of the internal surface of the casing to mold the same while in a flattened condition against said surface.

9. An apparatus for molding tire casings comprising an annular member having a vertical axis and provided with an internal surface of substantially uniform diameter which surface is provided with grooves or interstices to receive and support a tire casing substantially in a flatwise condition, inelastic means movable radially for engaging flatwise against the exposed surface of the casing, and means for positively forcing said inelastic means into contact with the whole exposed surface of the casing with uniform pressure or force.

10. In an apparatus for molding and vulcanizing tire casings, an annular member or ring having a vertical axis and an internal cylindrical surface of substantially uniform diameter, said interior surface having grooves or interstices to receive the ribs or protuberances of a molded casing and thereby hold the casing flat against said internal cylindrical surface during the molding operation.

11. The method of molding tire casings, which consists in suspending the initially molded casing flatwise within an annular rigid backing having a vertical axis by engaging the protuberances of the casing with interstices on said backing so as to maintain the casing flatwise, subjecting the whole of the inner periphery of said casing to radial and uniform pressure from a rigid press plate while so suspended, and applying heat thereto while so compressed.

12. The method of simultaneously molding and vulcanizing tire casings which consists in suspending the uncured cover or casing flatwise against a suitably grooved and heated annular surface having a vertical axis, subjecting it throughout to uniform pressure with radially movable inelastic segments, which move simultaneously into contact with the casing with equal force and applying heat to said casing while so supported and pressed in approximately the form of a cylinder having a vertical axis.

In testimony whereof I affix my signature in presence of two witnesses.

COLIN MACBETH.

Witnesses:
 BENJAMIN WILLIAM BETTNEY,
 MAY L. JONES.